Aug. 22, 1961   S. J. GOSS   2,996,840
TOY WHEELED VEHICLES
Filed July 14, 1959
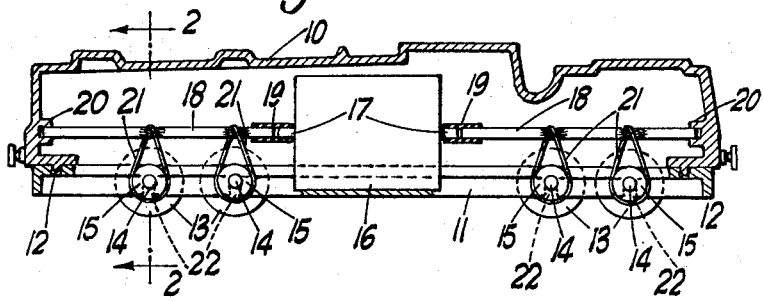
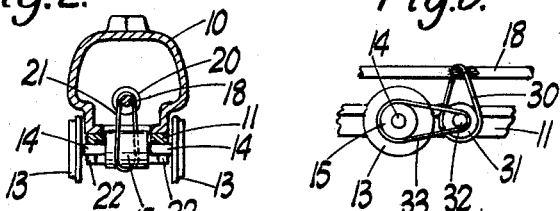
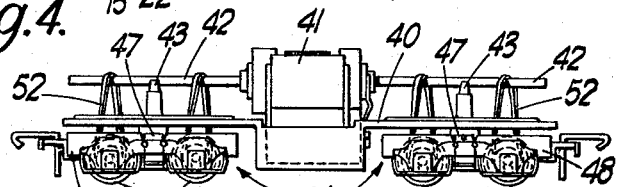
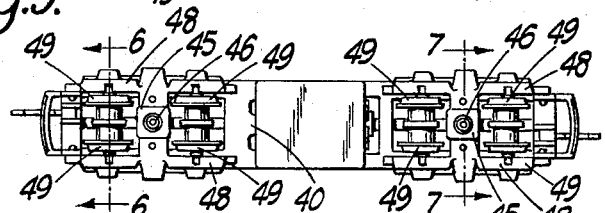
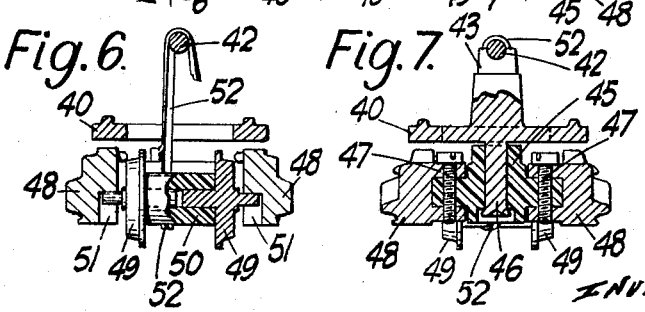

United States Patent Office 2,996,840
Patented Aug. 22, 1961

2,996,840
TOY WHEELED VEHICLES
Stuart Joseph Goss, Hatfield, England, assignor to A.G.M. Industries Limited, London, England, a British company
Filed July 14, 1959, Ser. No. 826,940
1 Claim. (Cl. 46—243)

This invention relates to toy wheeled vehicles having driving means, for example an electric motor or flywheel, for driving the wheels of the vehicle.

Such vehicles commonly require a considerable reduction ratio in the drive to the wheels and it is one of the objects of the present invention to provide, in such a vehicle, a drive which avoids the use of gears and which is particularly simple and economical to construct and which can give a considerable reduction ratio.

According to this invention, in a toy wheeled vehicle having at least one pair of wheels for engaging the ground or track, said wheels are driven by drive means comprising a flexible resilient belt driven by direct engagement with the surface of a driving shaft and engaging an element of larger diameter integral with or secured to a shaft carrying said wheels. This arrangement provides a particularly simply and economic form of construction which will give a reduction ratio equal to the ratio of the diameter of the driven element to the diameter of the driving shaft and which thus can give quite a substantial reduction ratio. The belt, since it is resilient, can be stretched tautly over the driving shaft and driven element so as to minimise slip in the drive.

Particularly for very small toy vehicles, it is often convenient to arrange that the driving shaft extends parallel to the direction of movement of the vehicle; for example, in vehicles driven by electric motors, it is often convenient to arrange the axis of the motor in the direction of movement of the vehicle. In such an arrangement the belt drive may have a twist so that the belt still directly engages the driving shaft and the driven element.

Very conveniently the belt is formed of rubber or rubber-like material and may be of any suitable section, for example flat or round section. The belt might, however, comprise a flexible helical spring formed into an endless loop.

A number of pairs of wheels on the vehicle may be driven by one belt arranged to pass over elements integral with or secured to shafts carrying the various pairs of wheels or alternatively a number of pairs of wheels on the vehicle may be driven by separate belts driven by direct engagement with a common driving shaft.

If a greater reduction ratio is required than can be obtained with one belt drive as described above, two such belt drives may be arranged in tandem, the first belt engaging a driving shaft and an element of larger diameter than said driving shaft on or integral with a lay shaft and a second belt engaging said lay shaft and an element of larger diameter than the lay shaft on or integral with a wheel shaft.

The driving shaft or each driving shaft, where it is engaged by the belt, may be splined or knurled in order to increase the frictional grip if desired. Although it would be possible to form a groove or the like on the shaft to prevent the belt moving axially, this in general is not necessary since in a toy vehicle the length of the drive will be quite short and the end of the belt engaging the shaft will be positioned on the shaft by the element engaging the other end of the belt.

The or each driven pair of wheels and said element together with their connecting shaft may be formed integrally as a single unit, conveniently by a die casting process.

The belt may readily be put under appreciable tension and can serve to hold the wheel shaft in position by pulling the wheel shaft upwardly into a U-shaped bearing portion on the underside or on an under-frame of the vehicle. If this under-frame is formed separately from the vehicle body, the belt tension may also be utilised to pull the under-frame on to locating pins on the body and so also hold the under-frame in position.

In the following description reference will be made to the accompanying drawings in which:

FIGURE 1 is a longitudinal sectional view of a model locomotive;

FIGURE 2 is a transverse sectional view along the line 2—2 of FIGURE 1;

FIGURE 3 is a diagram illustrating a modification of the arrangement of FIGURES 1 and 2;

FIGURE 4 is a view in side elevation of another construction of a toy locomotive with the outer casing removed;

FIGURE 5 is an underside plan view of the locomotive of FIGURE 4; and

FIGURES 6 and 7 are sections along the lines 6—6 and 7—7 of FIGURE 5 respectively.

Referring to FIGURES 1 and 2 there is illustrated a 000 gauge model railway locomotive which is formed with a die cast body structure 10 having an open underside and an under-frame 11 extending longitudinally along the under surface of this body. This under-frame 11 is located on the body structure 10 by means of pins 12 on the body structure engaging holes on the ends of the under-frame. Wheels 13 for running on a track (not shown) are formed integrally in pairs with a shaft 14 extending between the wheels having a relatively large diameter portion 15 formed integrally on the centre part of this connecting shaft. In the embodiment illustrated there are four such pairs of wheels which are all driven from an electric motor 16 although, if desired, only one or some of the pairs of wheels may be driven and further freely rotatable wheels may be provided. The motor 16 has a spindle 17 extending out of the motor casing at the two ends thereof and the motor is positioned so that the axis of this spindle lies in the direction of movement of the locomotive. Two driving shafts 18 are coupled respectively to the two ends of the spindle 17 by means of rubber bushes 19, the outer ends of the driving shafts 18 being supported in suitable holes formed in the body structure 10 as indicated at 20. Instead of having coupling bushes 19, the shafts 18 may be integral with the motor spindle. For each pair of driving wheels there is provided a rubber driving belt 21, conveniently of circular section, in the form of an endless loop which engages directly on the driving shaft 18 and passes around the large diameter portion 15 on the wheel shaft. It will be seen that since the wheel shaft is at right angles to the driving shaft there will have to be a twist in this driving belt. The driving belts are made of such length that they are under tension and they serve to retain the wheels and wheel shaft assemblies in position with the wheel shafts 14 engaging in U-shaped recesses 22 in the under-frame 11. The belts thus serve not only to drive the wheels but also to retain the wheels in position in the under-frame and also to hold the under-frame on the aforementioned pins 12 on the body 10. The shafts 18, where they are engaged by the belts 21, are knurled or splined to ensure a good frictional grip.

If a greater reduction ratio is required than can be obtained by a single belt drive as in the arrangement of FIGURES 1 and 2, then two such belt drives can be arranged in tandem as shown in FIGURE 3. In FIGURE 3 there is shown a part of a driving shaft 18, which, by means of a first belt drive 30, drives a larger diameter portion 31 of a lay shaft 32. The lay shaft 32 drives the wheels 13 through a second belt drive 33 extending around the lay shaft 32 and the enlarged diameter portion 15 on the wheel shaft.

Instead of having an enlarged diameter portion 15 integral with the wheel shaft 14, a pulley may be formed integrally with or may be secured on the wheel shaft to be driven by the belt.

Referring to FIG. 4 of the drawings, the toy locomotive shown therein has a main frame 40 carrying an electric motor 41 driving a main drive shaft 42 which extends substantially the whole length of the locomotive. This shaft is supported on oilless bearing members 43 on the main frame 40 and in addition the outer ends of the shaft may be supported in bearings in the outer casing (not shown) of the locomotive. The locomotive has two bogies 44 which are of similar construction, each being formed of a cross member 45 formed of electrically insulating material, conveniently a moulded plastic, which cross-member 45 is pivotally mounted on an upright pivot member 46 extending downwardly from the main frame 40. The lower end of this pivot member 46 is splayed out to secure the bogie in position. Secured by screws 47 to the cross-member 45 are two side frames 48 each extending the length of the bogie and formed of metal, conveniently by a die-casting operation. Each bogie has two pairs of wheels 49 and, as most clearly seen in FIGURE 6, the wheels 49 are flanged. These wheels are made of metal but are electrically insulated from one another by a plastic tube 50 which fits over stub shafts on the inner sides of the wheels. On the outer side of the wheels their shafts extend into recesses 51 (FIGURE 6) in the bogie side members 48. Each pair of wheels 49 with their tubular linking member 50 form an assembly which can be readily removed from the bogie, but which is held in position by a resilient band 52, conveniently a rubber band which extends around the aforementioned tube 50 and around the motor driving shaft 42 to drive the wheels from the electric motor in a manner similar to the arrangement described with reference to FIGURES 1 and 2. The diameter of the tube 50 is greater than the diameter of the driving shaft 42 to give a reduction ratio in the drive system.

With the construction of bogie described above, it will be seen that the two wheels of each pair are electrically insulated from one another. The two wheels on each side of each bogie are in electrical contact with the outer side member 48 on that side of the bogie. This form of construction is particularly arranged for use on a track in which the two rails form the two conductors for supplying power to a locomotive or other motor carrying vehicle. It will be seen that the two side frames of a bogie will be of opposite electrical polarity and these side frames may be connected by flexible leads (not shown) to the input terminals of the motor. The wheels thus pick up the electric power from the running rails and, by the use of the wheels on both bogies, continuity of supply is ensured when the vehicle passes over points or cross-overs having gaps in the electrified track.

It will be noted that the resilient bands 52 serve to hold the wheels in position in the bogies as well as providing a drive from the motor to the wheels. The tension in the resilient bands 52 also tends to keep the bogies aligned with the axis of the shaft 42 although permitting the vehicle to go around curves so that the vehicle can readily be put on to the track with the bogies properly aligned.

One or both bogies may be provided with four pairs of wheels instead of two pairs and, in that case, preferably each pair of the wheels is driven by a separate resilient band 52 from the driving shaft 42.

I claim:

In a toy wheeled vehicle, an under-frame, an electric drive motor carried on said under-frame, an output shaft driven by said electric motor extending parallel to the direction of movement of the vehicle, at least two pairs of wheels, the wheels of each pair being connected for conjoint rotation by an axle, downwardly opening U-shaped bearing portions on said under-frame directly rotatably receiving the axles of said wheels and a flexible resilient band for each pair of wheels, which band extends tautly over said output shaft and over the axle of the associated pair of wheels to hold the axles in said bearing portions and to drive the wheels; said bands constituting the sole support maintaining the respective wheel assemblies with their axles directly engaged in said bearing portions.

References Cited in the file of this patent

UNITED STATES PATENTS

| | | |
|---|---|---|
| 782,076 | Soule | Feb. 7, 1905 |
| 1,360,970 | Morgan | Nov. 30, 1920 |
| 1,542,139 | Ives | June 16, 1925 |
| 2,903,974 | Smith | Sept. 15, 1959 |